Figure 7:
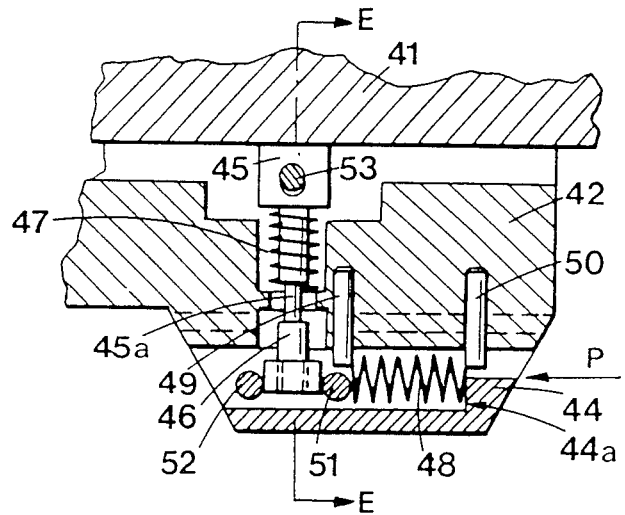

United States Patent [19]

Wüst

[11] Patent Number: 4,873,771

[45] Date of Patent: Oct. 17, 1989

[54] SLIDE GAUGE

[75] Inventor: Robert Wüst, Delemont, France

[73] Assignee: Schnyder & Cie, Bevilard, Switzerland

[21] Appl. No.: 170,682

[22] Filed: Mar. 14, 1988

[51] Int. Cl.⁴ ................................................. G01B 5/02
[52] U.S. Cl. ........................................ 33/802; 33/815
[58] Field of Search ................. 33/143 R, 143 K, 802, 33/815

[56] References Cited

U.S. PATENT DOCUMENTS 2,170,582  8/1939  Wolter ............................. 33/143 K
3,113,384  12/1963  Keszler ........................... 33/143 K Primary Examiner—Harry N. Haroian
Attorney, Agent, or Firm—Young & Thompson

[57] ABSTRACT

The slide (3) is provided with a pusher (5) mounted on an axle (7), wherein this axle (7) is connected to the slide (3) by way of a spring (8) pretensioned within a chamber (8a). If the measuring jaws (2) and (4) or (13) and (14) are pressed against the object to be measured with a specific measuring force, the axle (7) is displaced against the action of the spring, the displacement of the axle (7) being blocked by a clamping element (9) so that the force exerted on the object to be measured is given solely by the spring (8), the effect of the force exerted by the user on the pusher (5) being excluded. This arrangement permits precise measurement in opposite directions.

8 Claims, 2 Drawing Sheets

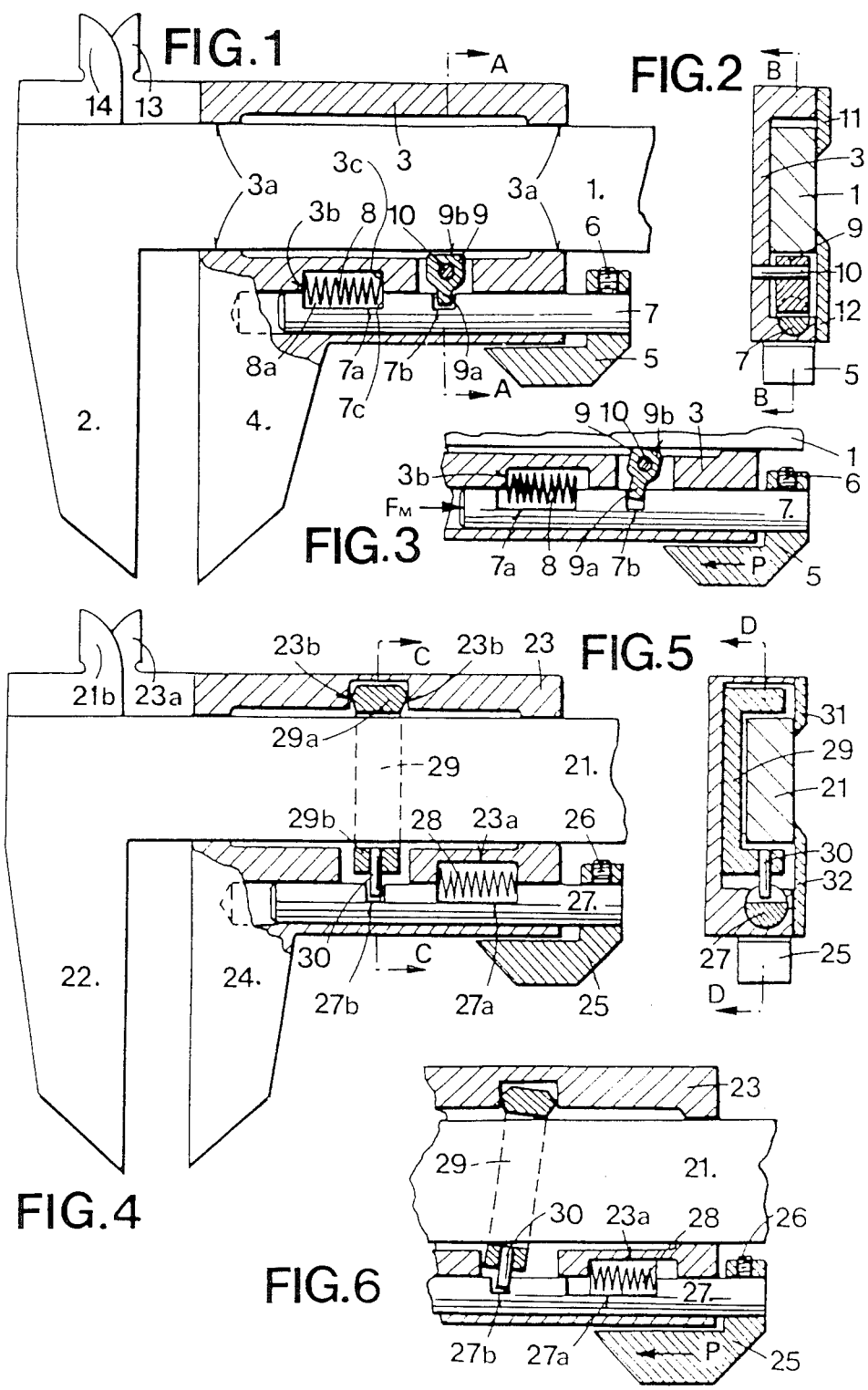

SLIDE GAUGE

The invention relates to a slide caliper consisting of a beam with at least one measuring jaw attached thereto, a slide sliding along the beam and provided with at least one measuring jaw, a pusher mounted in the slide to be movable in two opposite measuring directions, the slide being displaceable along the beam into the two opposite directions by means of this pusher, wherein the pusher is resiliently supported with respect to the slide in the two aforementioned directions.

A slide caliper of this type has been disclosed in Belgian Patent No. 429,752. In this slide caliper, permitting measurement in two opposite directions, a pusher is provided in the slide, supported in the latter by means of springs and movable into opposite measuring directions. In case pressure is exerted on this pusher, the latter moves relatively to the slide as soon as a measuring pressure is present at the jaws. This displacement is made visible with respect to the slide by means of a pointer arranged at the pusher. If limit marks are reached, then these positions correspond to a specific measuring pressure which can be optically detected in this way. The known slide caliper accordingly permits a measurement that can be repeated since the measuring force can be measured directly and the measurement can take place under the same measuring force. However, the conventional instrument exhibits the drawback that attention must be devoted during measuring to the value of the measuring pressure as well as the actual measured value.

The invention is based on the object of eliminating this drawback and providing a slide caliper permitting measurements in opposite directions wherein, when a specific measuring pressure has been reached, the slide is automatically clamped fast to the beam.

This object has been attained according to this invention by providing that the slide caliper includes a spring mounted under a predetermined bias between the slide and the pusher, this bias being larger than the displacement resistance of the slide on the beam so that the spring prevents relative displacement between the pusher and the slide during the free shifting of the slide in the two aforementioned directions; and that the slide caliper exhibits a clamping element cooperating with the pusher wherein, upon the occurrence of a measuring force exerted on the jaw of the slide in one of the aforementioned directions, the spring releases the pusher to such an extent that the latter operates the clamping element.

The slide caliper of this invention offers the advantages that by displacement into two opposite directions a strong pressure rise at the pusher signals to the user the desired constant measuring force. Thus, external and internal measurements can be performed while preventing overstressing of the measuring system which, in turn, has a beneficial effect on the measuring accuracy.

A preferred embodiment is characterized in that the spring is a coil spring and in that the slide as well as the pusher are equipped with at least two stop faces cooperating with the spring wherein, in the rest position of the pusher, each of the two end faces of the coil spring is in contact with one of the stop faces of the slide and of the pusher.

This arrangement permits a simple manufacture with few component parts. The single spring, pretensioned between the four abutment faces, furthermore provides exact determination of the rest position between the pusher and the slide.

Figure 8:
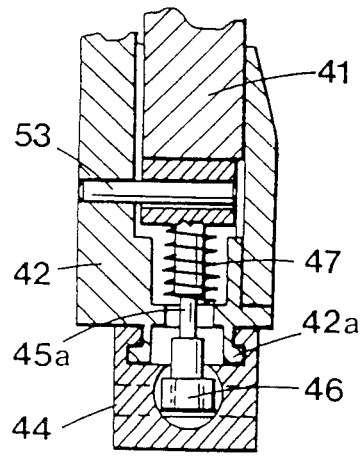

Further advantageous embodiments of the invention can be seen from the features set forth in the dependent claims and from the following description of three embodiments with reference to the appended drawings wherein:

FIG. 1 is an embodiment illustrated partially in a longitudinal section (section B—B in FIG. 2), FIG. 2 is a cross section A—A through FIG. 1, FIG. 3 is a fragmentary view of FIG. 1 with the pusher being in the clamping position, FIG. 4 is a partial longitudinal section (D—D in FIG. 5) through a second embodiment, FIG. 5 is a cross section C—C through FIG. 4, FIG. 6 shows a detail of FIG. 4 with the pusher in the clamping position, FIG. 7 shows a partial longitudinal section through a third embodiment, FIG. 8 is a cross section E—E through FIG. 7.

In FIGS. 1–3, a slide 3 supported on bearings 3a slides along a beam 1 equipped with measuring jaws 2 and 14. The slide 3 is guided on the beam in a manner known per se with its jaws 4 and 13 by means of guide strips 11 and 12 attached by means of screws, not shown. An axle 7 is arranged in the slide 3 to be movable in the longitudinal direction, a pusher 5 being mounted on this axle by means of a screw 6. The longitudinal movement of the axle 7 in the slide 3 is limited by mutually opposed recesses 3b of the slide and 7a of the axle 7, wherein the coil spring 8 is supported. These recesses 3b and 7b form a chamber 8a for the coil spring 8, these recesses 3b and 7b exhibiting on both sides stop faces 3c and 7c cooperating with the end faces of the coil spring 8. Each of the two end faces of the coil spring are in contact, in the rest position of the pusher (FIG. 1), with a stop face of the slide 3 and of the axle 7 of the pusher 5. The axle 7 furthermore contains a notch 7b engaged by the cam 9a of a clamping element 9 rotatable in the slide 3 about a pin 10.

If slide 3 is to be shifted along the beam 1, for example for effecting an external measurement, a pressure P (FIG. 3) is exerted on the pusher 5 in the displacement direction. The spring 8 is pretensioned and its bias is larger than the displacement resistance of the slide so that the axle 7 of the pusher does not move within the slide 3 during the displacement thereof. This changes as soon as a measuring pressure $F_M$ occurs at the jaw 4 of the slide 3. In order to overcome this measuring pressure, an increased pressure P must now be exerted on the pusher 5 thus overcoming the bias of the spring 8. The axle 7 can therefore move in the slide 3 in the advancing direction and as a result the clamping element 9 is rotated about its axle 10 located in the slide 3 and now presses with its face 9b against the beam 1. Thereby, the axle 7 of the pusher 5 can no longer be advanced and the pressure exerted on the slide remains restricted to the spring force of the spring 8 so that no increase in measuring force can occur any longer. At the same time, the clamping action exerts additional pressure on the bearings 3a of the slide 3 whereby the guidance play of the slide 3 on the beam 1 is eliminated and thereby the measuring accuracy is increased.

It is clearly apparent that the aforedescribed process can analogously be applied to internal measurements in that the pusher 5 and the axle 7 are shifted toward the right in FIG. 1. The special design of the spring 8 housed in chamber 8a thus permits measurements in opposite directions.

The embodiment illustrated in FIGS. 4-6 makes it possible for the slide 23 equipped with measuring jaws 23a and 24 to adapt more advantageously to the measuring object under the set measuring pressure after the slide has been placed in the measuring position by the pusher 25. The slide 23, sliding on the beam 21 equipped with measuring jaws 22 and 21b is guided by guide strips 31, 32 and screws, not shown, on the beam 21. The axle 27, supported within the slide, accommodates a pusher 25 attached by means of a screw 26. The spring 28 limiting the stroke of the axle 27 is accommodated in recesses 23a of the slide 23 and 27a of the axle 27. A U-shaped clamping element 29 is inserted in the slide 23 and is held at one end 29a loosely in the slide 23 by stops 23b while it engages, at the other end 29b, by means of a stud 30 into a recess 27b of the axle 27. During advancement, this axle 27 cannot shift within the slide 23 since this axle is under the bias of the spring 28. However, in case a measuring force occurs at the jaw 24 of the slide 23, this bias is overcome (FIG. 6) and, with increased pressure P exerted on the pusher 25, angular displacement of the clamping element 29 occurs which latter is thereby clamped fast to the beam 21 and thus terminates any further advancement of the pusher 5. In this position, the spring 28 exerts a specific pressure on the slide 23 causing the latter to assume now freely the most favorable measuring position. Once the pusher 25 is moved back, after termination of the measurement, the clamping element 29 again assumes its initial position and releases the beam 21. The slide caliper can be utilized analogously in the opposite direction for internal measurements.

FIGS. 7 and 8 show another embodiment of the invention. The slide 42 is equipped with a T-shaped guide 42a wherein a pusher 44 is arranged to slide in the two opposite measuring directions. The pusher 44 is held in its position by a spring 48 which latter contacts, on the one hand, pins 49 and 51, on the other hand, the pin 50 and a stop face 44a of the pusher 44.

A clamping member 45 is supported on a stud 53 in the slide 42 and is provided with a shank 45a closed off by a nut 46. Follower pins 51 and 52, attached in the pusher 44, are in contact with the nut 46. A spring 47 supported in the slide 42 urges the clamping member 45 against the beam 41. If, now, the pusher 44 is moved in direction P, for example during external measurements, then it first of all entrains the slide 42 by way of the pretensioned spring 48. The spring 48 is dimensioned so that no relative displacement occurs between the pusher 44 and the slide 42 as long as the slide 42 is moved freely along the beam 41. Such relative displacement occurs only once the slide 42 is retained by the measuring object. By further exerting an impact on the pusher 44, the latter can now overcome the force of the spring 48 and act by way of the stud 51 on the nut 46. Thereby, the clamping member 45 is caused to tilt and, being supported on the stud 53, can clamp tightly to the beam 41 so that the movement of the slide 42 on the beam 41 is impeded. Once the pusher 44 is released, the system is again unlocked.

Also in this example the action of the pusher 44 can take place in both measuring directions (externally and internally).

The invention, of course, is not limited to merely the illustrated examples; rather, the latter can be altered additionally within the idea of this invention as defined in the claims. Thus, for instance, the clamping elements shown in FIGS. 1 through 6 can also be operated directly by the pusher without an axle 7 or 27. The clamping element 45, 46 illustrated in FIGS. 7 and 8 can also be in engagement with an axle according to FIGS. 1-6.

I claim:

1. Slide caliper, comprising a beam with at least one measuring jaw mounted thereon, a slide sliding along the beam and provided with at least one measuring jaw, a pusher supported in the slide to be movable in two opposite measuring directions, by means of which the slide can be shifted on the beam in the two opposite directions, wherein the pusher is resiliently supported with respect to the slide in the two aforementioned directions, a spring supported under a predetermined bias between the slide and the pusher, this bias being larger than the displacement resistance of the slide on the beam, so that the spring prevents a relative displacement between the pusher and the slide during the free displacement of the slide in the two aforementioned directions, a clamping element for selectively clamping the slide to the beam and releasing the slide for movement along the beam, and means responsive to movement of the pusher relative to the slide upon the imposition on the pusher of a force greater than said bias, to move the clamping element to clamp the beam, thereby to limit the measuring force exerted by said jaws on an object being measured.

2. Slide caliper according to claim 1, wherein the spring is a coil spring and the slide as well as the pusher are provided with at least two stop faces cooperating with the spring, wherein, in the rest position of the pusher, each of the two end faces of the coil spring is in contact with one of the stop faces of the slide and of the pusher.

3. Slide caliper according to claim 2, and an axle displaceable in parallel to the measuring direction in the slide, the pusher being mounted on this axle.

4. Slide caliper according to claim 3, wherein the axle and the pusher have mutually opposed recesses fashioned in such a way that they form jointly a chamber for the coil spring, wherein the recesses have on both sides stop faces cooperating with the end faces of the coil spring.

5. Slide caliper according to claim 1 wherein the pusher is accommodated in guide grooves of the slide to be movable in the measuring direction.

6. Slide caliper according to claim 3, characterized in that the clamping element consists of a lever supported in the slide, this lever having, on the one hand, a surface in contact with the beam and, on the other hand, engagement into a recess in one of the axle and the pusher in such a way that, by adjusting said one of the axle and the pusher relatively to the slide, the clamping element is rotated and is thereby clamped fast to the beam.

7. Slide caliper according to claim 3, there being plural clamping elements which extend in a U-shape around the beam, the two legs thereof being in contact, with surfaces under little clearance, with the guide faces of the beam, and the clamping element, on the one hand, being movably supported in the slide, on the other hand engaging into one of the axle and the pusher in such a way that longitudinal movement of said one of the axle and the pusher brings about angular adjustment of the clamping element relatively to the beam, whereby the clamping element is clamped fixedly to the beam.

8. Slide caliper according to claim 1 characterized in that the clamping member has an axle oriented perpendicularly to the beam, which axle engages, at its end, into the pusher or the first-mentioned axle, wherein the clamping member is urged against the beam by means of a spring supported in the slide.

* * * * *